United States Patent

Ifesinachukwa et al.

Patent Number: 6,137,279
Date of Patent: Oct. 24, 2000

[54] ADJUSTABLE POWER CONTROL MODULE AND APPLICATIONS THEREOF

[75] Inventors: Kenneth Gozie Ifesinachukwa; Mathew A Rybicki, both of Austin, Tex.

[73] Assignee: Sigmatel, Inc., Austin, Tex.

[21] Appl. No.: 09/376,501

[22] Filed: Aug. 18, 1999

[51] Int. Cl.⁷ ................................................. G05F 3/16
[52] U.S. Cl. ........................................ 323/317; 323/274
[58] Field of Search ................................. 323/317, 316, 323/315, 274

[56] References Cited

U.S. PATENT DOCUMENTS

| | | | |
|---|---|---|---|
| 5,063,342 | 11/1991 | Hughes et al. | 323/315 |
| 5,142,219 | 8/1992 | Hsu et al. | 323/317 |
| 5,796,276 | 8/1998 | Phillips et al. | 323/317 |

*Primary Examiner*—Shawn Riley
*Attorney, Agent, or Firm*—Timothy W. Markison

[57] ABSTRACT

An adjustable power control module includes a supply voltage comparison circuit, a signal dependent current source, and a power regulation module. The supply voltage comparison circuit is operably coupled to compare a supply voltage with a low-powered threshold. When the supply voltage is less than the low-power threshold, the supply voltage comparison circuit provides a corresponding indication to the signal dependent current source. The signal dependent current source generates a first regulated current when the supply voltage is less than the low powered threshold based on the indication and generates a second regulated current when the supply voltage is above the low power threshold. The second regulated current is larger than the first regulated current. The power regulation module provides the first or second regulated current to an associated circuit. As such, the current supplied to the circuit is regulated based on operating conditions for the circuit. As such, when operating conditions dictate that more power can be provided to the circuit, the adjustable power control module provides more current conversely when the operating conditions indicate less power, the adjustable power control module provides less power.

15 Claims, 2 Drawing Sheets

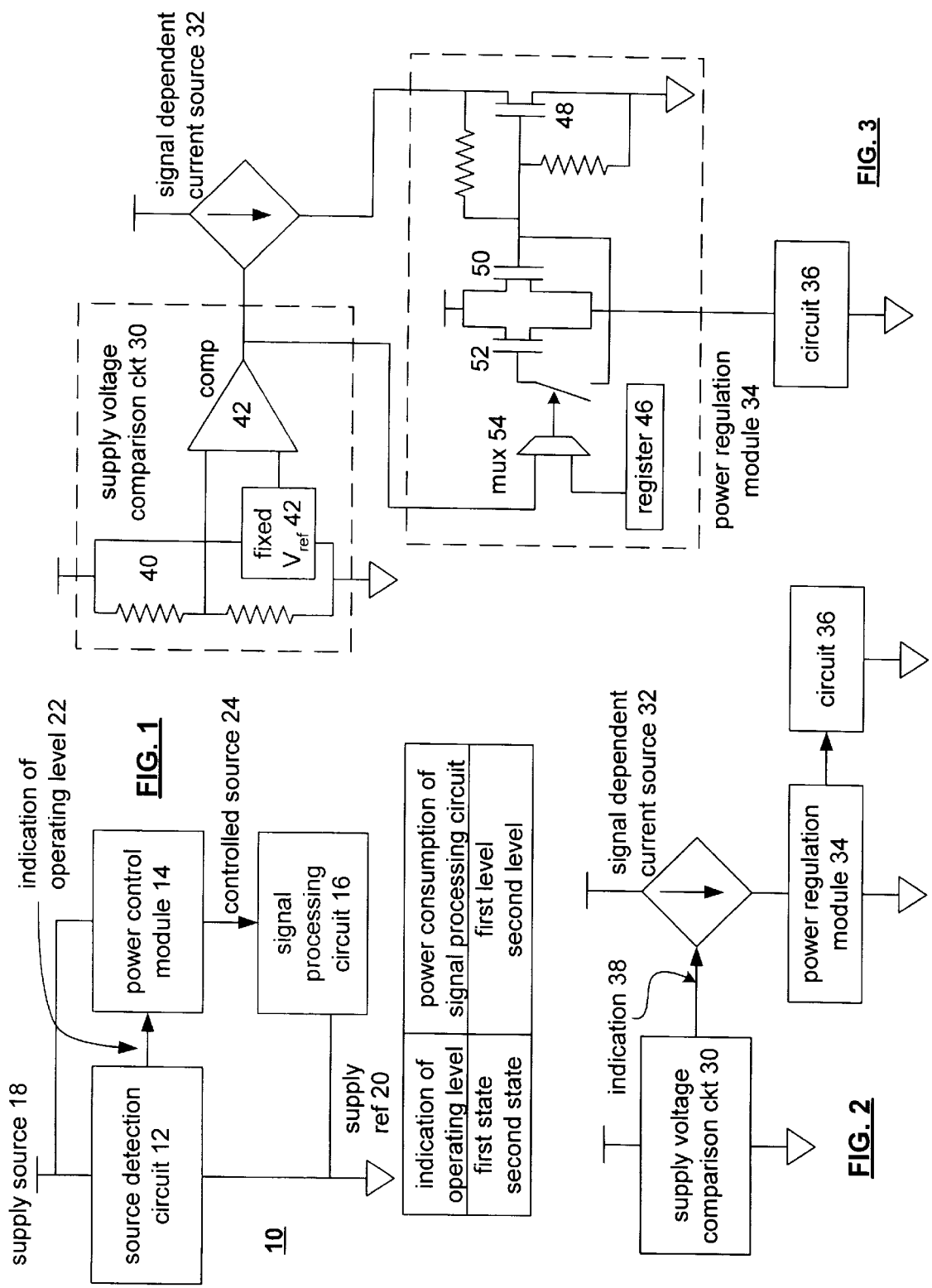

ADJUSTABLE POWER CONTROL MODULE AND APPLICATIONS THEREOF

TECHNICAL FIELD OF THE INVENTION

The present invention relates generally to power savings techniques and more particularly to an adjustable power control module that controls power consumption of an associated circuit based on certain operating conditions.

BACKGROUND OF THE INVENTION

As is known, the current trend in the design of battery operated electronic equipment is to provide enhanced performance in smaller packages, while consuming less power. Accordingly, the components comprising the electronic equipment must provide enhanced performance in smaller packages, while consuming less power. As such, designers of electronic equipment and the corresponding components have created a multitude of power saving techniques. Such techniques, however, are usually specific to a particular set of operating conditions that include supply voltage, desired performance level, and usage. For example, when a component or circuit within the electronic equipment is intermittently used, a power regulation circuit disables the component or circuit during times when it is not in use. When the component is enabled, it draws the power it needs to operate.

As is also known, many types of battery operated electronic equipment may also be externally powered (e.g., by a power supply) or may have externally powered equivalents. Such powered devices typically include similar functionality and, hence, include similar components. Components for externally powered devices, however, have less stringent power consumption requirements and typically do not employ power conservation techniques. Components of battery operated electronic equipment that may also be powered by an external source may have different power consumption requirements depending on whether the electronic equipment is being powered by a battery or an external source. Typically, components function better when supplied with more power. For example, an amplifier has lower offset and greater drive capability when supplied with greater power.

As such, the component manufacturer may make several versions of the same component, one for each of the various operating conditions and types of power sources. For integrated circuits, this requires separate mask sets, packaging, and testing, which adds to the overall cost of the component. Therefore, a need exists for an adjustable power control circuit that is adjustable based on operating conditions and the types of power sources.

BRIEF DESCRIPTION OF THE DRAWING

FIG. 1 illustrates a schematic block diagram of an adjustable power control module in accordance with the present invention;

FIG. 2 illustrates an alternate embodiment of an adjustable power control module in accordance with the present invention;

FIG. 3 illustrates a more detailed schematic block diagram of the adjustable power control module of FIG. 2;

DETAILED DESCRIPTION OF A PREFERRED EMBODIMENT

Figures 4, 5:
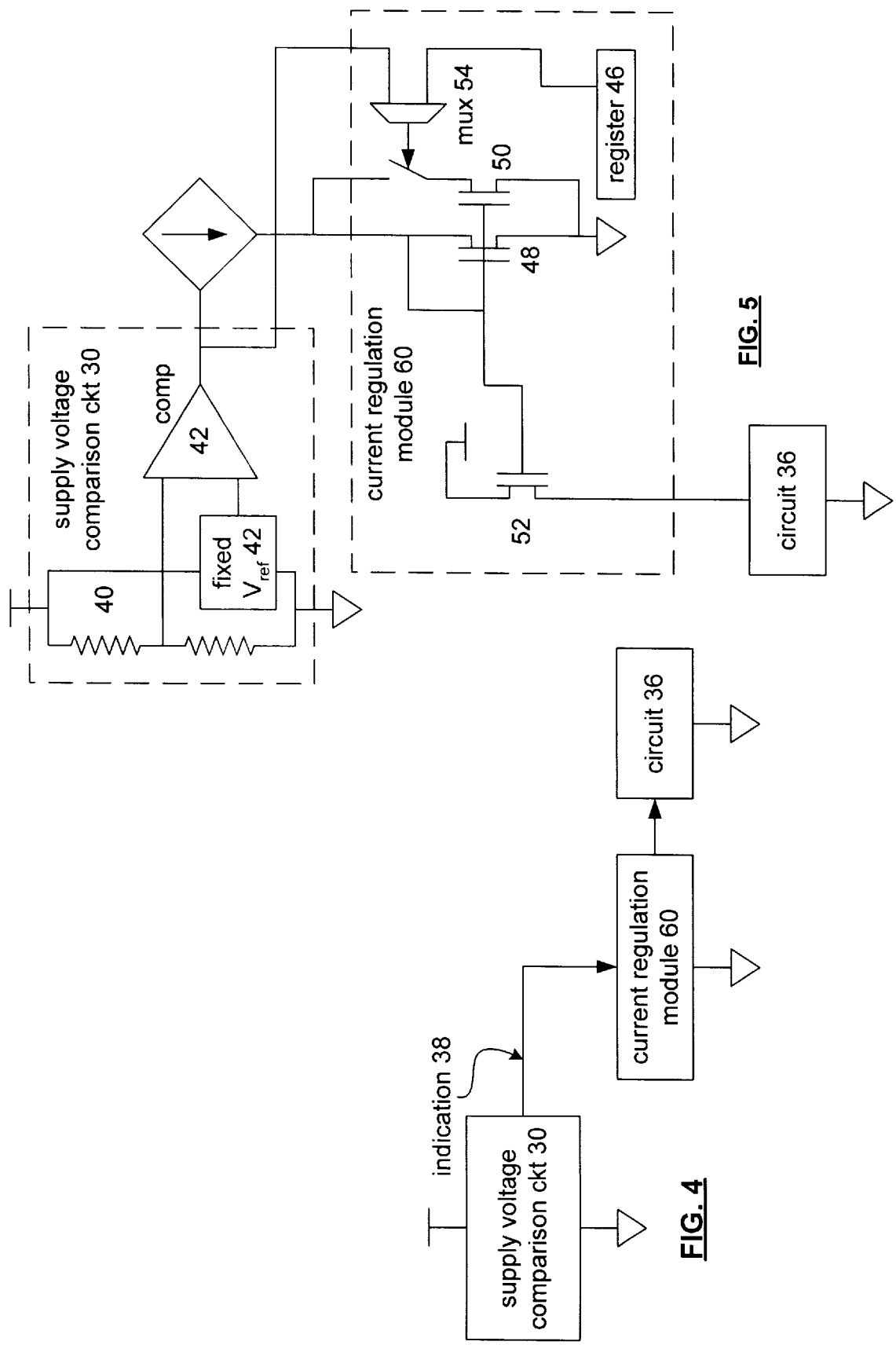
FIG. 4 illustrates another embodiment of an adjustable power control module in accordance with the present invention.
FIG. 5 illustrates a more detailed schematic block diagram of the adjustable power control module of FIG. 4.

Generally, the present invention provides an adjustable power control module that includes a supply voltage comparison circuit, a signal dependent current source, and a power regulation module. The supply voltage comparison circuit is operably coupled to compare a supply voltage with a low-powered threshold. When the supply voltage is less than the low-power threshold, the supply voltage comparison circuit provides a corresponding indication to the signal dependent current source. The signal dependent current source generates a first regulated current when the supply voltage is less than the low power threshold based on the indication and generates a second regulated current when the supply voltage is above the low power threshold. The second regulated current is larger than the first regulated current. The power regulation module provides the first or second regulated current to an associated circuit. As such, the current supplied to the circuit is regulated based on operating conditions for the circuit. As such, when operating conditions dictate that more power can be provided to the circuit, the adjustable power control module provides more current. Conversely when the operating conditions indicate less power, the adjustable power control module provides less power. In this instance, the adjustable power control module regulates the amount of power received by the circuit.

The present invention can be more fully described with reference to FIGS. 1 through 5. FIG. 1 illustrates a schematic block diagram of an adjustable power control module 10 that includes a source detection circuit 12, and a power control module 14, which are coupled to a signal processing circuit 16. The source detection circuit 12 is operably coupled between a supply source 18 and a supply reference 20. The supply source 18 may be from a battery that produces 1.5 volts, 2.2 volts, 3 volts, 3.3 volts, 4.5 volts, 5 volts, 6 volts, 9 volts, etc. or may be from an external power supply. Regardless of the type of source, the source detection circuit provides an indication of the operating level 22 to the power control module 14. The indication of operating level 22 may be based on the magnitude of the supply source 18, which may be voltage and/or current. The source detection circuit 12 may further generate the indication of operating level 22 based on user inputs. For example, the user may select a desired power level to achieve a particular performance. Based on these inputs, the source detection circuit 12 produces the corresponding indication. Such will be discussed in greater detail with reference to FIG. 3.

The power control module 14, based on the indication of operating level 22, generates a controlled source 24. The signal processing circuit 16 may be digital-to-analog converter, analog-to-digital converter, digital logic circuit, an analog circuit, an amplifier, a gain stage, an adjustable gain stage, a mixing circuit, and/or any other type of digital and/or analog circuit. As such, the control source 24 dictates the power consumption of the signal processing circuit 16. The control module 14 provides a first level of the controlled source 24 when the indication is in a first state and provides a second level of the controlled source 24 when the indication is in the second state. For example, if the first state indicates that a low power operation is to be performed, the power control module 14 provides a first low power controlled source to the signal processing circuit. Conversely, the second state of the indication may indicate a higher power of operation. As such, the second level of control source 24 is higher than the first. As one of average skill in the art will appreciate, more that two levels may be used.

As one of average skill in the art would readily appreciate the source detection circuit 12 may be implemented as further described with reference to FIGS. 2 through 5, may be hard wired into an incorporating circuit, or may be triggered by an external input from the adjustable power circuit. In addition, the controlled source 24 may be a controlled current and/or a controlled voltage.

FIG. 2 illustrates a schematic block diagram of an alternate embodiment of the adjustable power control module that includes a supply voltage comparison circuit 30, a signal dependent current source 32, a power regulation module 34, and a circuit 36. Note that the circuit 36 may be similar to the signal processing circuit 16 of FIG. 1. The supply voltage comparison circuit 30 is operably coupled between the supply source and supply reference. By monitoring the supply, the supply voltage comparison circuit generates an indication 38. The indication 38 drives the signal dependent current source 32 to produce a corresponding controlled current. The power regulation module 34 is operably coupled to receive the controlled current produced by the current source 32 which in turn provides it to the circuit 36.

FIG. 3 illustrates a more detailed schematic block diagram of the adjustable power control module of FIG. 2. In this illustration, the supply voltage comparison circuit 30 is shown to include a voltage divider 40, a fixed voltage reference module 42 and a comparator 43. The voltage divider 40 produces a representation of the supply voltage which is fed to one input of the comparator 43 and the second input of the comparator 43 is coupled to the fixed voltage reference 42. When the representation of the supply voltage exceeds the fixed reference voltage 42, the comparator 43 drives the signal dependent current source into a higher state. In addition, the output of comparator 43 may be provided to the power regulation module 34. As one of average skill in the art would appreciate, the divider 40 may include more than one tab and the comparator 43 may be a plurality of comparators. In such an embodiment, one comparator may provide the control signal to the signal dependent current source 32 while a second comparator provides the signal to the power regulation module 34. In this multi-comparator embodiment several different levels of power regulation may be achieved.

The power regulation module 34 includes a current mirror, which is comprised of transistors 48, 50 and 52, a multiplexor 54 and a register 46. The register 46 is operable to receive user inputs as to the desired power consumption level. The transistors 48, 50 and 52 of the current mirror may be sized to provide a particular current ratio between the current generated by the current source 32 and the current supplied to circuit 36. Such a ratio may be in the range of 1 to 10 or 10 to 1. In operation, when the switch is open, thereby disabling transistor 52, the current mirror is comprised of transistors 48 and 50. If the signal dependent current source 32 generates current, it is received by transistor 48 and mirrored by transistor 50 based on the ratio between transistors 48 and 50. The regulated current is then provided to the circuit 36.

The switch may be closed by either information contained within register 46 or the output of comparator 43. In either case, when the switch is closed, transistor 52 is in parallel with transistor 50 thereby changing the ratio between the transistors in the current mirror.

FIG. 4 illustrates a schematic block diagram of another embodiment of the adjustable power control module. This embodiment includes a supply voltage comparison circuit 30, a current regulation module 60 and a circuit 36. The supply voltage comparison circuit 30 provides an indication 38 to the current regulation module 60. In response, the current regulation module provides a controlled source to circuit 36.

FIG. 5 illustrates a more detailed schematic block diagram of the adjustable power control module of FIG. 4. As shown, the supply voltage comparison circuit 30 is similar to the circuit described in FIG. 3. The current regulation module 60 is similar to the power regulation module 34 of FIG. 3 but differs in the doubling of the transistors within the current mirror. In this embodiment, the current regulation module includes a current mirror that includes transistors 48, 50 and 52. In this embodiment, the transistors 48 and 50 are operably coupled to the current source while transistor 52 is coupled to the circuit. In this embodiment, when transistor 50 is open, the current mirror has a ratio between transistor 48 and 52. When the switch is closed, thereby paralleling transistor 50 with transistor 48, the current ratio in the current mirror is based on the parallel combination of transistor 50 and 48 to the transistor 52. If transistors 50 and 52 are of the same size, by paralleling transistor 52, the supply current is doubled.

The preceding discussion has presented various embodiments of an adjustable power control module. By utilizing such a power control module in integrated circuit design, a single integrated circuit may be generated and used with various power sources and under various operating conditions. As one of average skill in the art would appreciate, other embodiments may be derived from the teachings presented herein without deviating from the scope of the present invention.

What is claimed is:

1. An adjustable power control module comprises:
a supply voltage comparison circuit operably coupled to compare a supply voltage with a low power threshold, wherein the supply voltage comparison circuit provides a low power indication when the supply voltage compares unfavorably with the low power threshold;
a signal dependent current source operably coupled to provide a regulated current, wherein the signal dependent current source provides a first regulated current when the low power indication indicates the unfavorable comparison and provides a second regulated current when the low power indication indicates a favorable comparison; and
power regulation module operably coupled to the signal dependent current source and to a circuit, wherein the power regulation module regulates power consumption of the circuit in accordance with the first or second regulated currents.

2. The adjustable power control module of claim 1, wherein the supply voltage comparison circuit further comprises a fixed reference voltage, a comparator, and a voltage divider, wherein a first input of the comparator is operably coupled to the fixed reference voltage, and a second input of the comparator is operably coupled to the voltage divider that divides the supply voltage.

3. The adjustable power control module of claim 1, wherein the power regulation module further comprises a current mirror circuit having a predetermined current ratio, wherein a first transistor of the current mirror is operably coupled to the supply voltage and the circuit, and wherein a second transistor of the current mirror is operably coupled to the signal dependent current source.

4. The adjustable power control module of claim 3, wherein the power regulation module further comprises a third transistor operably coupled to provide a second predetermined current ratio, wherein the third transistor is enable to provide the second predetermined current ratio when the supply voltage compared favorably with the low power threshold.

5. The adjustable power control module of claim 4, wherein the power regulation module further comprises a register that stores power setting, wherein when the power setting are enabled to select the first or second predetermined current ratio, the power regulation circuit provides the first or second predetermined current in accordance with the power setting.

6. An adjustable power control module comprises:

a supply voltage comparison circuit operably coupled to compare a supply voltage with a low power threshold, wherein the supply voltage comparison circuit provides a first power indication when the supply voltage compares unfavorably with the low power threshold and provides a second power indication when the supply voltage compares favorably with the low voltage power threshold; and current regulation module operably coupled to the supply voltage comparison circuit and to a circuit, wherein the current regulation module regulates current provided to the circuit in accordance with the first or second power indications.

7. The adjustable power control module of claim 6, wherein the supply voltage comparison circuit further comprises a fixed reference voltage, a comparator, and a voltage divider, wherein a first input of the comparator is operably coupled to the fixed reference voltage, and a second input of the comparator is operably coupled to the voltage divider that divides the supply voltage.

8. The adjustable power control module of claim 6, wherein the current regulation module further comprises a current mirror that includes first, second, and third transistors, wherein the first transistor is operably coupled to the supply voltage and the circuit, wherein the second transistor is operably coupled to the supply voltage comparison circuit, wherein the third transistor is operably coupled to the supply voltage comparison circuit, and wherein the first transistor mirrors a first current through the second transistor when the supply voltage comparison circuit provides the first power indication and the first transistor mirrors a second current through the second and third transistors when the supply voltage comparison circuit provides the second power indication.

9. The adjustable power control module of claim 8, wherein the current regulation module further comprises a register that stores power setting, wherein, when the power setting are enabled to override the first or second power indications, the current regulation module provides the first or second current in accordance with the power setting.

10. A circuit having controlled power consumption comprises:

source detection circuit operable to detect an operating level of a supply source and to provide an indication of the operating level of the supply source;

a signal processing circuit operably coupled to receive a signal and to produce therefrom a processed signal; and power control module operably coupled to the source detection circuit and to the signal processing circuit, wherein the power control module controls the power consumption of the signal processing circuit to a first power consumption level when the indication of the operating level of the supply source is in a first state and controls the power consumption of the signal processing circuit to a second power consumption level when the indication of the operating level of the supply source is in a second state.

11. The circuit of claim 10, wherein the signal processing circuit comprises at least one of: a digital to analog converter, an analog to digital converter, a digital logic circuit, an analog circuit, an amplifier, a gain stage, an adjustable gain state, and a mixing circuit.

12. The circuit of claim 10, wherein the source detection circuit comprises a comparison circuit that includes a fixed reference voltage, a comparator, and a voltage divider, wherein a first input of the comparator is operably coupled to the fixed reference voltage, and a second input of the comparator is operably coupled to the voltage divider that divides a supply voltage.

13. The circuit of claim 10, wherein the source detection circuit comprises a comparison circuit that includes a fixed reference current, a comparator, and a current divider, wherein a first input of the comparator is operably coupled to the fixed reference current, and a second input of the comparator is operably coupled to the current divider that divides a supply current.

14. The circuit of claim 10, wherein the source detection circuit comprises an analog to digital converter operably coupled to convert the supply source into a digital signal that provides the indication of the operating level of the supply source.

15. The circuit of claim 10, wherein the power control module comprises:

a signal dependent current source operably coupled to provide a regulated current, wherein the signal dependent current source provides a first regulated current when the indication of the operating level of the supply source is in the first state and provides a second regulated current when the indication of the operating level of the supply source is in the second state; and power regulation module operably coupled to the signal dependent current source and to the signal processing circuit, wherein the power regulation module regulates the power consumption of the signal processing circuit in accordance with the first or second regulated currents.

* * * * *